US008152631B2

(12) United States Patent
Anderson

(10) Patent No.: US 8,152,631 B2
(45) Date of Patent: Apr. 10, 2012

(54) STREAMING VIDEO FOR ELECTRONIC GAMING MACHINES WITH REAL-TIME INTERACTIVE CONTROL

(75) Inventor: Peter R. Anderson, Glenview, IL (US)

(73) Assignee: WMS Gaming, Inc., Waukegan, IL (US)

( * ) Notice: Subject to any disclaimer, the term of this patent is extended or adjusted under 35 U.S.C. 154(b) by 300 days.

(21) Appl. No.: 12/600,158

(22) PCT Filed: May 14, 2008

(86) PCT No.: PCT/US2008/006107

§ 371 (c)(1), (2), (4) Date: Nov. 13, 2009

(87) PCT Pub. No.: WO2008/143844

PCT Pub. Date: Nov. 27, 2008

(65) Prior Publication Data

US 2010/0248817 A1 Sep. 30, 2010

Related U.S. Application Data

(60) Provisional application No. 60/930,466, filed on May 16, 2007.

(51) Int. Cl.
*G06F 17/00* (2006.01)

(52) U.S. Cl. ........................................................ 463/25

(58) Field of Classification Search ............... 463/16–25
See application file for complete search history.

(56) References Cited

U.S. PATENT DOCUMENTS

| | | | | |
|---|---|---|---|---|
| 6,409,602 | B1 | 6/2002 | Wiltshire et al. | |
| 6,508,709 | B1 * | 1/2003 | Karmarkar | 463/42 |
| 6,749,572 | B2 * | 6/2004 | Edwardsen et al. | 600/459 |
| 6,863,608 | B1 | 3/2005 | LeMay et al. | |
| 6,945,870 | B2 | 9/2005 | Gatto et al. | |
| 7,112,138 | B2 | 9/2006 | Hedrick et al. | |
| 2002/0065132 | A1 | 5/2002 | Stephan | |
| 2005/0020358 | A1 * | 1/2005 | Cram | 463/31 |
| 2005/0255911 | A1 | 11/2005 | Nguyen et al. | |
| 2006/0073887 | A1 | 4/2006 | Nguyen et al. | |

(Continued)

FOREIGN PATENT DOCUMENTS

EP 1439506 A2 7/2004

(Continued)

OTHER PUBLICATIONS

Written Opinion corresponding to co-pending International Patent Application Serial No. PCT/US2008/006107, European Patent Office; dated Oct. 30, 2008; 5 pages.

(Continued)

*Primary Examiner* — Ronald Laneau
(74) *Attorney, Agent, or Firm* — Nixon Peabody LLP

(57) ABSTRACT

An illustrative method provides real-time streaming video generated and transmitted from a server to an electronic gaming machine (EGM) that permits wagering on games. The EGM transmits a video request to the server during the play of a first game on the EGM. The video request includes information that specifies corresponding video images to be displayed during the play of the first game. Streaming video information is generated by and received from the server in response to the video request and processed to create the video images. The video images are displayed by the EGM during the ongoing play of the first game.

26 Claims, 4 Drawing Sheets

U.S. PATENT DOCUMENTS

2007/0004506 A1 1/2007 Kinsley et al.

FOREIGN PATENT DOCUMENTS

| | | | |
|---|---|---|---|
| WO | WO 2004/024268 | A1 | 3/2004 |
| WO | WO 2004/105458 | A2 | 12/2004 |
| WO | WO 2005/027062 | A1 | 3/2005 |
| WO | WO 2005/099841 | A1 | 10/2005 |
| WO | WO 2005/105244 | A2 | 11/2005 |
| WO | WO 2006/002084 | A1 | 1/2006 |
| WO | WO 2007/005290 | A1 | 1/2007 |
| WO | WO 2007/015887 | A1 | 2/2007 |
| WO | WO 2007/022294 | A2 | 2/2007 |

OTHER PUBLICATIONS

International Search Report corresponding to co-pending International Patent Application Serial No. PCT/US2008/006107, European Patent Office; dated Oct. 30, 2008; 3 pages.

* cited by examiner

STREAMING VIDEO FOR ELECTRONIC GAMING MACHINES WITH REAL-TIME INTERACTIVE CONTROL

CROSS-REFERENCE TO RELATED APPLICATIONS

This application is a U.S. National Stage of International Application No. PCT/US2008/006107, filed May 14, 2008, which claims the benefit of U.S. Provisional Application No. 60/930,466, filed on May 16, 2007, both of which are incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2007 WMS Gaming Inc.

FIELD OF THE INVENTION

The present invention relates generally to electronic gaming machines (EGMs) that support wagering on wagering games, and more particularly to the display of video on screens of EGMs.

BACKGROUND OF THE INVENTION

Electronic gaming machines, such as video slot machines and video poker machines, are a cornerstone of the gaming industry. EGMs, especially microprocessor-based gaming machines that follow a client/server configuration, provide flexibility through software control and the ability to communicate data and download software from a supporting server. Although EGMs are clients of a server, EGMs render the images displayed during the execution of a game based on data that is locally resident, i.e. data that is stored at the EGM or generated at the EGM in the course of the play of the game. There are situations where the EGM may obtain data from a remote device during the play of a game such as when the player is participating in a wide area jackpot game. In this situation, data related to the wide area jackpot is received by the EGM during the play of the game and the EGM locally processes this data by its video rendering engine to generate a corresponding image, e.g. display of the current value of the bonus. While such techniques have generally proved satisfactory, these techniques fail to maximize advantages associated with operation in a real-time client/server relationship. For example, maintaining and updating audio and visual content at a server is more efficient than having to change this content stored at each EGM. Therefore, it is desirable to take advantage of the client/server relationship with regard to the real-time display of video by an EGM during the play of a game.

SUMMARY OF THE INVENTION

According to one aspect of the present invention, an embodiment includes a method that provides real-time streaming video generated and transmitted from a server to an electronic gaming machine (EGM) that permits wagering on games. The EGM transmits a video request to the server during the play of a first game on the EGM. The video request includes information that specifies corresponding video images to be displayed during the play of the first game. Streaming video information is received from the server in response to the video request and processed, e.g. uncompressed, to create the video images. The video images are displayed by the EGM during the ongoing play of the first game.

According to another aspect of the invention, an embodiment includes an EGM adapted to implement this method.

According to a further aspect of the present invention, an embodiment includes a method that supports the generation and transmission of streaming video images from a server to electronic gaming machines (EGMs) that permit wagering on games. The streaming video images are to be displayed by a first EGM. A video request is received by the server from the first EGM where the video request is received during play of a first game on the first EGM. A video library is accessed to determine data associated with the video request. Video images based on the data are generated in real-time during the ongoing play of the first game on the server. Streaming video information corresponding to the video images is transmitted in real-time to the first EGM.

According to another aspect of the invention, an embodiment includes a server adapted to implement the method of the above paragraph.

According to yet another aspect of the invention, a computer readable tangible storage medium is encoded with instructions for enabling an EGM and server to perform the above methods, respectively.

Additional aspects of the invention will be apparent to those of ordinary skill in the art in view of the detailed description of various embodiments, which is made with reference to the drawings, a brief description of which is provided below. The use of the same reference numeral in the drawings is utilized to denote identical or similar elements.

DETAILED DESCRIPTION

Various embodiments of this invention can be utilized. The drawings and descriptions of embodiments of the invention exemplify its principles and are not intended to limit the broad aspect of the invention to only the illustrated embodiments.

Figure 1:
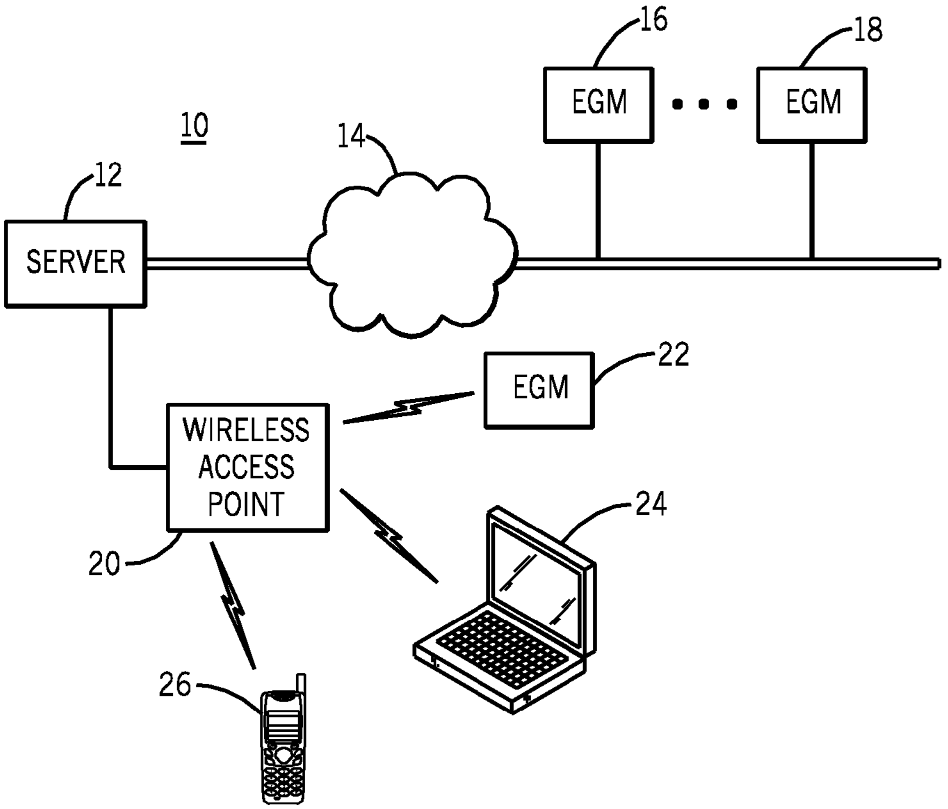
FIG. 1 is a block diagram of a gaming system suited for incorporation of an embodiment of the present invention.

Referring to FIG. 1, an illustrative gaming system 10 includes a server 12 that supports a plurality of EGMs. The server includes a nonvolatile storage resource such as for storing configuration data used by the server, gaming software and image data. A bidirectional communication channel and a communication network 14 support high speed communications between the server and stationary EGMs 16-18. A wireless access point 20 is coupled to the server and supports high speed wireless communication links with a variety of stationary and mobile gaming machines such as stationary EGM 22, portable computing device 24, e.g. laptop computer, and a personal communication device 26, e.g. a cell telephone with data capabilities. A "stationary" EGM refers to electronic gaming machine of a cabinet style that remains fixed during the play of a game by a user. A "mobile" gaming machine refers to an electronic gaming machine contained in a portable apparatus that can be transported by a user during the play of a game. For example, a mobile gaming machine could include a laptop computer with wireless capabilities, a personal digital assistant with wireless capabilities, a cellular telephone with appropriate input and output capabilities, etc.

Figure 2:
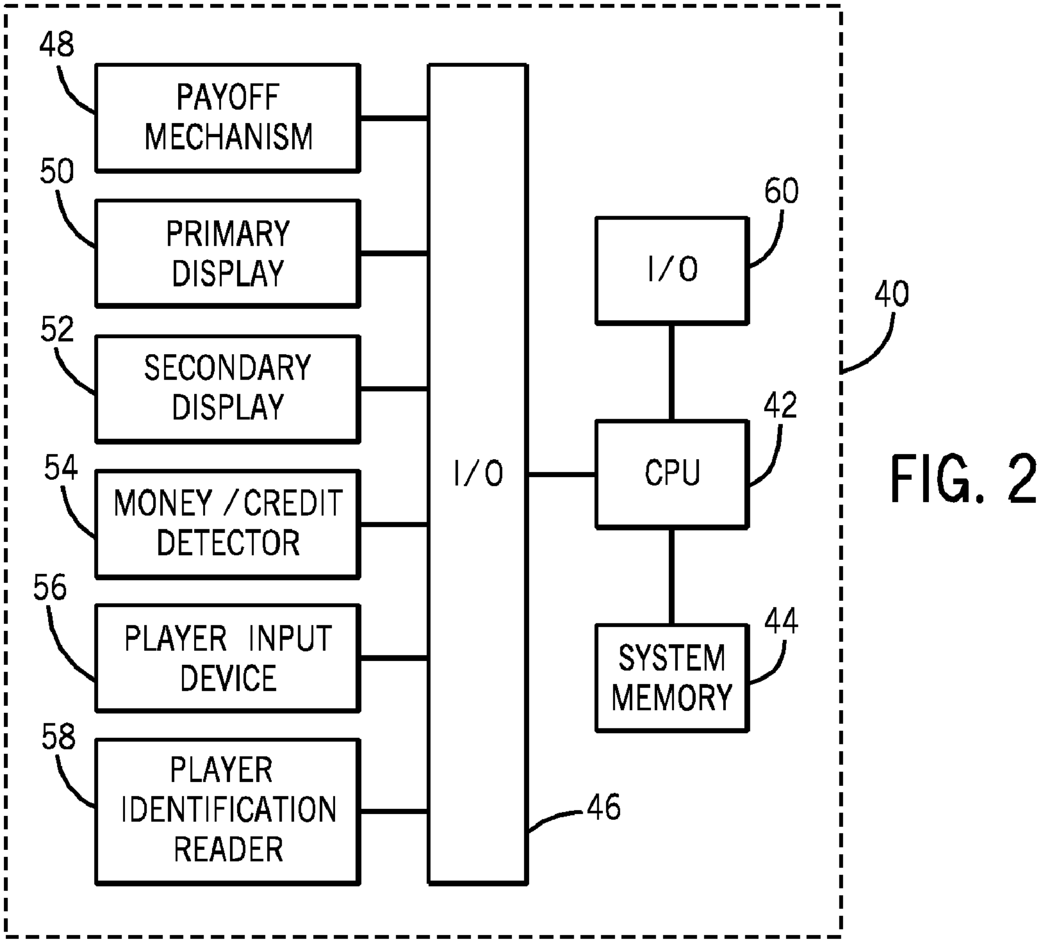
FIG. 2 is a block diagram of a representative EGM.

FIG. 2 shows an embodiment of an EGM 40 that includes a central processing unit (microprocessor) 42 that is supported by system memory 44 that may include read-only memory, random access memory and a nonvolatile storage memory such as a hard drive. An input/output module 46 supports internal communications between the CPU 42 and various input and output devices. These devices may include a payoff mechanism 48, a primary display 50, a secondary display 52, a money/credit detector 54, a player input device 56 and a player identification reader 58. These devices are intended to be representative of a variety of input and output devices that may be employed by the EGM. A communications input/output device 60 provides an interface between the CPU 42 and server 12 enabling bidirectional communications. In accordance with the illustrative system 10, the input/output device 60 supports bidirectional data communications over a wired link or over a wireless link with wireless access point 20.

Figure 3:
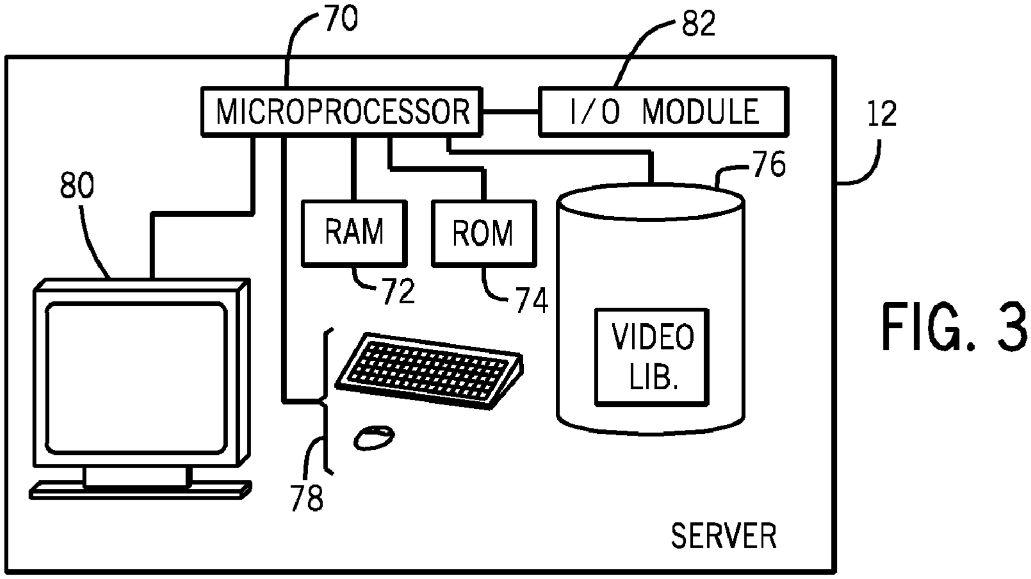
FIG. 3 is a block diagram of a representative server.

FIG. 3 is a representative embodiment of a server 12. A microprocessor 70 performs processes and tasks based on stored program instructions. It is supported by read-only memory (ROM) 72, random access memory (RAM) 74 and nonvolatile data storage device 76. As will be understood by those skilled in the art, data and stored program instructions in ROM 72 is typically utilized by microprocessor 70 to initialize and boot the computing apparatus. An application program, e.g. a program that controls the implementation of one or more functions performed by the server, is stored in storage element 76. At least active portions of the application program will be typically stored in RAM 74 for ready access and processing by microprocessor 70. A variety of user inputs 78 such as a keyboard, keypad, and mouse can be utilized to control the operation of the server and applications running on it. A display screen 80 provides a visual output, e.g. characters and/or charts of operational parameters and visual representation of EGMs and related status of the EGMs, for an administrator of the server. An input/output (I/O) module 82 provides a communication interface permitting microprocessor 70 to transmit and receive data with the stationary and mobile gaming machines. As will be described in detail below, the server generates real-time streaming video that is transmitted to an EGM for display on the screen of the EGM where the video is based on interactive real-time inputs received from the EGM during game play at the EGM.

Figure 4:
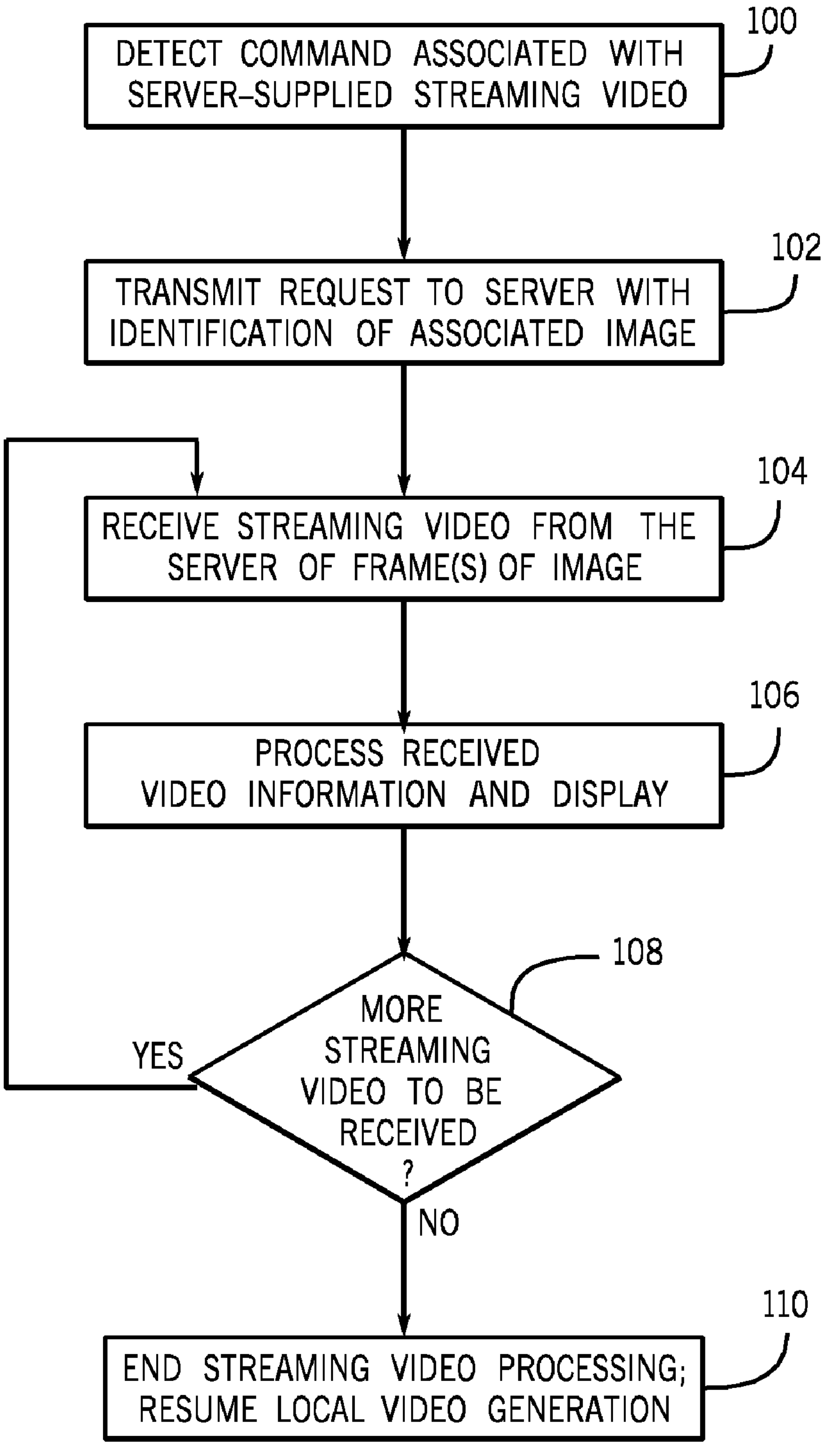
FIG. 4 is a flow chart of an illustrative method implemented by an EGM in accordance with an embodiment of the present invention.

FIG. 4 shows a flow chart of an illustrative method implemented by an EGM wherein images displayed by the EGM are supplied by streaming real-time video from a server and are based on real-time commands sent during the play of the game from the EGM to the server. As used herein, "real-time video from the server" refers to video that is received from a remote source during the ongoing execution of the application program (game) in which the video is to be displayed, e.g. real-time video from the server would not include images received from the server and stored at the EGM prior to the start of the subject application program. Similarly, a "real-time command" refers to a command that is transmitted by the EGM during the ongoing play of a game, e.g. a video request command transmitted to the server during ongoing execution of the game at the EGM where the requested video is needed for display prior to completion of the play of the game.

In step 100, the EGM detects a local command associated with the need for server-supplied streaming video. The command may be in response to the player's input, e.g. a touch screen entry, depressing a button, control of an object displayed on the screen by the player, etc. Alternatively, the command may be initiated by software controlling the active game being played, e.g. images associated with a selection to be made by the player (spinning objects with different indicia, etc.) can be requested for display on the EGM. In step 102 the EGM transmits a request to the server that includes identification of an associated image. The request may be to initiate the transmission of streaming video, may be a request to modify streaming video currently being transmitted to the EGM, or may be a request to terminate the transmission of streaming video. Because the server will likely be supporting a plurality of EGMs, the request preferably identifies the EGM as well as containing information sufficient to permit the server to determine the specific streaming video images to be used.

In step 104 the EGM receives streaming video from the server containing one or more frames to be displayed at the EGM. Depending upon the particular game being played, the video refresh rate, and the minimum time permitted between sensing user inputs, two or more consecutive frames of the image to be displayed may be transmitted as a unit from the server to EGM. In step 106 the EGM processes the received streaming video information and displays a corresponding image on the screen of the EGM. To conserve bandwidth, the one or more frames of image information may be transmitted from the server in a compressed format which must be expanded by the EGM before being displayed. In accordance with known formats, e.g. the various Moving Pictures Expert Group (MPEG) formats, compression can be achieved by transmitting data containing only the difference between consecutive frames to be displayed.

In step 108 a determination is made by the EGM of whether more streaming video is to be received. A YES determination results in further processing at step 104 in which further frames of information are received and processed. A NO determination causes a termination of the processing of streaming video and a resumption of the local generation of video at the EGM in step 110. Processing of the received streaming video by the EGM preferably consists of only uncompressing the video data.

Figure 5:
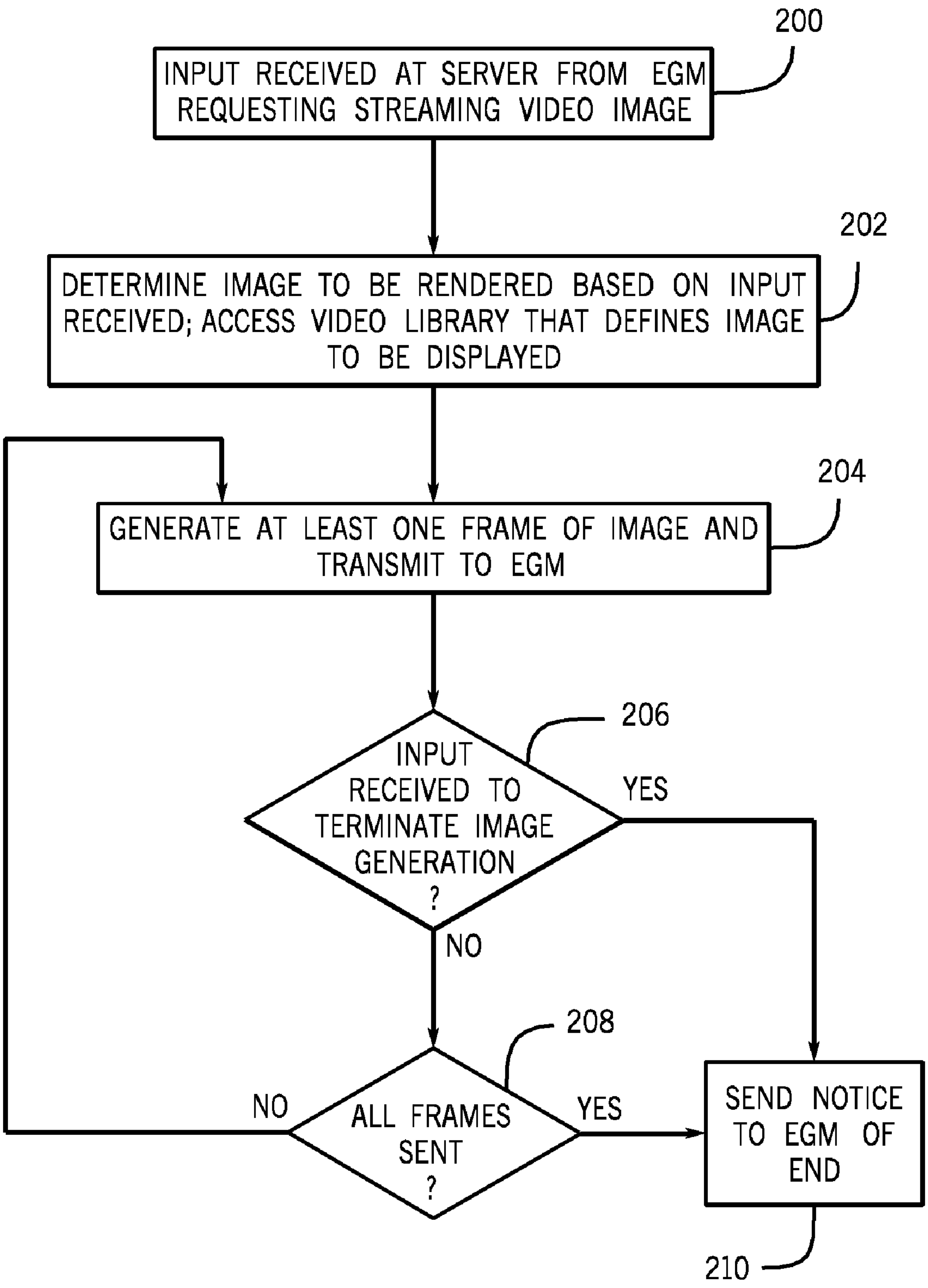
FIG. 5 is a flow chart of an illustrative method implemented by a server in accordance with an embodiment of the present invention.

FIG. 5 is a flow chart of an illustrative method implemented by a server by which streaming video images are transmitted to a requesting EGM for display during the real-time play of a game at the EGM and in response to inputs generated as part of the real-time game play. In step 200 the server receives a request from the EGM to receive streaming video. In step 202 the server determines the image to be rendered based on the request received from the EGM. The request will include information that permits the server to identify the image, series of images, or data information from which the images are constructed. This image can be built from separate composite image data. The image information can be stored in a video library accessible by the server. In step 204 at least one frame is generated and transmitted to the EGM. This may include compressing the frame information into compressed format data or file. In step 206 a determination is made by the server of whether the received request is for the termination of image generation. For example, an EGM could make such a request upon the completion of game play, or upon the completion of a portion of a game during which streaming video is required. A NO determination by step 206, indicating that streaming image generation is to continue, results in a determination in step 208 at the server of whether all frames of the requested streaming image have been sent. A NO determination by step 208, indicating that additional frames of the requested streaming image are to be transmitted, returns processing that the step 204 for the continued generation of additional frames. A YES determination by step 206 or a YES determination by step 208 results in step 210 causing the server to send the notice to the EGM indicating that the transmission of streaming video is terminated. The receipt of such a notice by the EGM causes control of the image generation to be shifted to local generation by the EGM itself.

Depending upon the design of the game being played, an endless loop of streaming video may be requested. For example, one or more spinning objects rendered by streaming video may be displayed on the screen of the EGM. Because of the design of the game, these objects may continue to spin until an action by the player is initiated that causes the objects to stop spinning.

In the above embodiments the real-time streaming video transmitted from the server contains one or more frames of video information where one frame represents the entire image to be shown on the entire screen of the EGM. In accordance with another aspect of the present invention, the real-time streaming video information transmitted from the server may represent an image to be displayed on only a portion of the screen of the EGM. For example, the game software running on EGM may be responsible for generating an image comprising 80% of the total area of the screen with the remaining 20% of the area of the screen being rendered based on the received streaming video from the server. Thus the total screen is formed by a composite of these two image sources. In this example, the streaming video may represent a spinning or changing object that resides within the 20% of the screen. This will minimize the computational burden on the EGM for video generation since the moving or changing object within the 20% of the screen would represent a disproportionately large part of the video computational load if this portion had to be generated locally by the EGM. The burden placed on the EGM in receiving the streaming video and processing the received video information into the rendered image is substantially less than the video computational load that would have been experienced by the EGM if it had to generate the moving or changing object within the 20% of the screen. Therefore, it may be advantageous in some applications to have the EGM locally generate a portion of the image to be displayed on the screen while utilizing streaming video received from the server to render the other portion of the image displayed on the screen of the EGM. It should be understood that the portions generated by the EGM and received via streaming video from the server may occupy discreet and separate areas of the display, or may be overlapping or overlaid either in part or in whole.

The EGMs and/or server in one example employs one or more computer readable signal bearing tangible media that stores software, firmware and/or assembly language for performing one or more portions of one or more embodiments of the invention. The computer-readable signal-bearing tangible media in one example comprises one or more of a magnetic, electrical, optical, biological, and atomic data storage medium. For example, the computer-readable signal-bearing media may comprise floppy disks, magnetic tapes, CD-ROMs, DVD-ROMs, hard disk drives, USB flash memory and electronic memory modules.

The steps or operations described herein are only examples. There may be many variations to these steps or operations without departing from the spirit of the invention. For instance, the steps may be performed in a differing order, or steps may be added, deleted, or modified.

Each of these embodiments and obvious variations thereof are contemplated as falling within the spirit and scope of the claimed invention, which is set forth in the following claims.

What is claimed is:

1. A method implemented by an electronic gaming machine (EGM), which permits wagering on games, for displaying video images comprising:

transmitting a real-time video request to a server coupled to the EGM where the real-time video request is transmitted during the play of a first wagering game on the EGM, the real-time video request including information that specifies a corresponding one or more video images to be displayed during the play of the first wagering game;

receiving real-time streaming video information from the server in response to the real-time video request;

processing the real-time steaming video information to create the one or more video images related to the first wagering game;

displaying the one or more video images on a screen of a video display of the EGM during the ongoing play of the first wagering game; and locally generating in the EGM a locally generated image that occupies a portion of the screen, wherein the processing further includes compositing in real-time the one or more video images with the locally generated image to produce a composite display on the screen such that at least portions of the one or more videos and the locally generated image are visible as a composite image simultaneously on the screen.

2. The method of claim 1 further comprising detecting an input entered by a player during play of the first wagering game, where the transmitting of the real-time video request is initiated in response to the detecting of the input.

3. The method of claim 2 wherein the input defines the information that specifies the corresponding one or more video images to be displayed during the play of the first wagering game.

4. The method of claim 1 further comprising generating first images displayed during the play of the first wagering game based only on data residing at the EGM where the generating step precedes the displaying step.

5. The method of claim 1 further comprising monitoring for receipt of a termination message from the server where the termination message signifies the cessation of transmission of the streaming video information by the server.

6. The method of claim 5 further comprising generating second images displayed during the play of the first wagering game based only on data residing at the EGM where the generating step follows the receipt of the termination message.

7. The method of claim 1 wherein the one or more video images to be displayed comprises one or more complete video frames that define the image to be displayed on substantially all of the screen at the EGM.

8. The method of claim 1, wherein the processing is carried out locally in the EGM and consists of uncompressing the real-time video information, which comprises multiple frames of image information that are compressed at the server.

9. The method of claim 1, further comprising:

receiving a monetary wager via the wager-input device associated with the EGM;

converting the monetary wager into an opportunity for a player to play the wagering game on the EGM;

initiating the wagering game on the EGM;

generating a random number via a random-number generator configured to output random numbers;

correlating the random number output by the random-number generator to a wagering-game outcome via the processor;

displaying a representation of the wagering-game outcome on the video display, the representation of the wagering-game outcome comprising the one or more video images;

determining whether the wagering-game outcome corresponds to a predefined winning outcome or a losing outcome via the processor; and converting the winning outcome, if any, into a monetary award.

10. An electronic gaming machine (EGM) that permits wagering on games comprising:

an input/output module that transmits a real-time video request to a server where the real-time video request is transmitted during the play of a first wagering game on the EGM, the real-time video request including information that specifies a corresponding one or more video images to be displayed during the play of the first wagering game;

the input/output module receives real-time streaming video information from the server in response to the real-time video request; and a microprocessing unit processes the real-time steaming video information to create the one or more video images, wherein the microprocessing unit:

causes the display of the one or more video images on a screen of a video display associated with the EGM during the ongoing play of the first wagering game, generates a locally generated image that occupies a portion of the screen, and composites in real-time the one or more video images with the locally generated image to produce a composite display on the screen such that at least portions of the one or more videos and the locally generated image are visible as a composite image simultaneously on the screen.

11. The EGM of claim 10 further comprising the microprocessing unit detecting an input entered by a player during play of the first wagering game, where the input/output module transmits the real-time video request in response to the detecting of the input.

12. The EGM of claim 11 wherein the input defines the information that specifies the corresponding one or more video images to be displayed during the play of the first wagering game.

13. The EGM of claim 10 further comprising the microprocessing unit generating first images displayed during the play of the first wagering game based only on locally stored data prior to the display of the one or more video images.

14. The EGM of claim 10 further comprising the microprocessing unit monitoring for receipt of a termination message from the server where the termination message signifies the cessation of transmission of the streaming video information by the server.

15. The EGM of claim 14 further comprising the microprocessing unit generating second images displayed during the play of the first wagering game based only on locally stored data where the second images are displayed following the receipt of the termination message.

16. The EGM of claim 10 wherein the one or more video images to be displayed comprises one or more complete video frames that define the image to be displayed on substantially all of a screen at the EGM.

17. A method implemented by a server that supports electronic gaming machines (EGMs) that permit wagering on games, the method providing streaming video images to be displayed by a first EGM comprising:

receiving a real-time video request from the first EGM where the real-time video request is received during play of a first wagering game on the first EGM as the result of an event associated with game play;

accessing a video library to determine data associated with the real-time video request;

generating in real-time during the ongoing play of the first wagering game one or more video images based on the data;

transmitting real-time streaming video information corresponding to the one or more video images to the first EGM to cause the first EGM to composite in real-time the one or more video images with a local image that occupies a portion of a screen of a video display of the EGM to produce a composite display on the screen such that at least portions of the one or more videos and the local image are visible as a composite image simultaneously on the screen.

18. The method of claim 17 further comprising monitoring for receipt of a termination message received from the first EGM where the termination message signifies the cessation of transmission of the streaming video information.

19. The method of claim 17 further comprising:

determining whether all streaming video information associated with the real-time video request has been transmitted to the first EGM; and upon determining that all streaming video information associated with the real-time video request has been transmitted to the first EGM, transmitting a notice to the first EGM indicating that no further video information remains to be transmitted in response to the real-time video request.

20. The method of claim 17 further comprising compressing the one or more video images to form the streaming video information transmitted to the first EGM.

21. A server that supports electronic gaming machines (EGMs) that permit wagering on games, the server providing real-time streaming video images to be displayed by a first EGM, the server comprising:

a microprocessing unit receives a real-time video request from the first EGM where the real-time video request is received during play of a first wagering game on the first EGM as the result of an event associated with game play;

a video library that stores data associated with the video images;

the microprocessing unit accesses the video library to determine the data associated with the real-time video request;

the microprocessing unit generates in real-time during the ongoing play of the first game one or more video images based on the data;

the microprocessing unit utilizes an input/output module to transmit streaming video information corresponding to the one or more video images to the first EGM to cause the first EGM to composite in real-time the one or more video images with a local image that occupies a portion of a screen of a video display of the EGM to produce a composite display on the screen such that at least portions of the one or more videos and the local image are visible as a composite image simultaneously on the screen.

22. The server of claim 21 further comprising the microprocessing unit monitoring for receipt of a termination message received from the first EGM where the termination message signifies the cessation of transmission of the streaming video information.

23. The server of claim 21 further comprising:

the microprocessing unit determining whether all streaming video information associated with the real-time video request has been transmitted to the first EGM; and responsive to the microprocessing unit determining that all streaming video information associated with the real-time video request has been transmitted to the first EGM, the microprocessing unit transmits a notice to the first EGM indicating that no further video information remains to be transmitted in response to the real-time video request.

24. The server of claim 21 further comprising the microprocessing unit compresses the one or more video images to form the streaming video information transmitted to the first EGM.

25. A tangible computer readable storage medium encoded with instructions for controlling an electronic gaming machine (EGM) that permits wagering on games for displaying video images comprising:

computer readable storage instructions for transmitting a real time video request to a server coupled to the EGM where the real-time video request is transmitted during the play of a first wagering game on the EGM, the real-time video request including information that specifies a corresponding one or more video images to be displayed during the play of the first wagering game;

computer readable storage instructions for receiving real-time streaming video information from the server in response to the real-time video request;

computer readable storage instructions for processing the real-time steaming video information to create the one or more video images related to the first wagering game;

computer readable storage instructions for displaying the one or more video images on a screen of a video display of the EGM during the ongoing play of the first wagering game; and computer readable storage instructions for compositing in real time the one or more video images with a local image that occupies a portion of the screen to produce a composite display on the screen such that at least portions of the one or more videos and the local image are visible as a composite image simultaneously on the screen.

26. A tangible computer readable storage medium encoded with instructions for controlling a server that supports electronic gaming machines (EGMs) that permit wagering on games, the server providing streaming video images to be displayed by a first EGM, the medium comprising:

computer readable storage instructions for receiving in real-time a video request from the first EGM where the real-time video request is received during play of a first game on the first EGM as the result of game play;

computer readable storage instructions for accessing a video library to determine data associated with the real-time video request;

computer readable storage instructions for generating in real-time during the ongoing play of the first game one or more video images based on the data;

computer readable storage instructions for causing the transmission of streaming video information corresponding to the one or more video images to the first EGM to cause the first EGM to composite in real-time the one or more video images with a local image that occupies a portion of a screen of a video display of the EGM to produce a composite display on the screen such that at least portions of the one or more videos and the local image are visible as a composite image simultaneously on the screen, the local image being local to the first EGM.

* * * * *